United States Patent
Chan et al.

(10) Patent No.: US 7,853,427 B2
(45) Date of Patent: Dec. 14, 2010

(54) CLEARANCE ESTIMATION SYSTEM AND METHOD FOR A ROTARY MACHINE

(75) Inventors: David So Keung Chan, Niskayuna, NY (US); Emad Andarawis Andarawis, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/118,904

(22) Filed: May 12, 2008

(65) Prior Publication Data

US 2009/0281766 A1 Nov. 12, 2009

(51) Int. Cl.
*G01B 5/02* (2006.01)
(52) U.S. Cl. ...................................................... 702/158
(58) Field of Classification Search ................. 702/155, 702/158, 94, 95, 97, 199; 73/37.5, 37.6, 73/455, 579, 655
See application file for complete search history.

(56) References Cited

U.S. PATENT DOCUMENTS 7,151,957 B2 * 12/2006 Beker et al. ................. 600/509

2007/0005294 A1 * 1/2007 Andarawis et al. .......... 702/155

OTHER PUBLICATIONS

Merriam-Websters Online Dictionary, "number", http://www.merriam-webster.com/dictionary/number Jan. 19, 2009.*

* cited by examiner

*Primary Examiner*—Drew A Dunn
*Assistant Examiner*—Stephen J Cherry
(74) *Attorney, Agent, or Firm*—Joseph J. Christian

(57) ABSTRACT

A method of estimating a clearance between at least one rotating object of a rotary machine and a second object is provided. The method includes measuring an operating parameter of the rotary machine. The method also includes obtaining signals corresponding to the at least one rotating object across multiple revolutions in time, wherein the number of the revolutions is determined based upon the measured operating parameter. The method further includes generating waveforms corresponding to the at least one rotating object from the obtained signals for the revolutions. The method also includes estimating the clearance between the second object and the at least one rotating object based upon the generated waveforms.

15 Claims, 8 Drawing Sheets

CLEARANCE ESTIMATION SYSTEM AND METHOD FOR A ROTARY MACHINE

BACKGROUND

The invention relates generally to active clearance control for turbomachinery, and more particularly to clearance estimation for turbine engines.

Active clearance control systems for turbine engines may employ sensors to monitor the distance between two objects. By way of background, a turbine has a number of turbine blades that are disposed adjacent to a shroud. The clearance between each of the turbine blades and the shroud varies depending on the temperature of the respective turbine blade and shroud. For example, the clearance between the shroud and the turbine blades is greatest when the turbine is cold and gradually decreases as the turbine temperature increases. It is desirable that a minimal gap or clearance between the turbine blades and the shroud be maintained for effective operation of the turbine. A sensor may be disposed within the turbine to measure the distance between the respective turbine blades and the shroud. The distance may be used to direct movement of the shroud to maintain the desired displacement between the shroud and the turbine blades.

In certain applications, capacitive probes may be employed to measure the clearance between two objects. The probe is typically located on one of the objects and measures a capacitance with respect to the other object for estimating the clearance between the two objects. Unfortunately, existing measurement techniques employing capacitive probes may be inaccurate across the measurement range due to limitations on the signal-to-noise ratio (SNR) of such probes.

In certain systems, complex detection techniques are employed to enhance the SNR of the probe. For example, amplifiers are coupled to the sensors to amplify signals from the probe. Further, amplified signals are transmitted to a processing unit through cables for estimation of the clearance. However, such signals may include associated noise components as the signals travel from the amplifier to the processing unit. Furthermore, it is desirable to perform the amplification process as close as possible to the sensor, this requires that the amplifiers be designed to survive harsh environments such as within the turbine thereby resulting in reliability and lifetime limitations.

Moreover, in certain systems, large sensor elements are employed to increase the signal SNR. However, such probes are typically limited to large target geometries due to poor spatial resolution for small geometries. Certain systems employ resonant circuits to increase a gain of such probes. Unfortunately, high complexity calibration techniques may be required for such systems for addressing the resonance characteristics drifts of such circuits.

Accordingly, a need exists for providing a clearance estimation system that provides an accurate measurement of clearance between two objects by minimizing the effect of noise in a system.

BRIEF DESCRIPTION

In accordance with an embodiment of the invention, a method of estimating a clearance between at least one rotating object of a rotary machine and a second object is provided. The method includes measuring an operating parameter of the rotary machine. The method also includes obtaining signals corresponding to the at least one rotating object across multiple revolutions in time, wherein the number of the revolutions is determined based upon the measured operating parameter. The method further includes generating waveforms corresponding to the at least one rotating object from the obtained signals for the revolutions. The method also includes estimating the clearance between the second object and the at least one rotating object based upon the generated waveforms.

In accordance with another embodiment of the invention, a clearance estimation system for a rotary machine is provided. The system includes a sensor disposed on a stationary component of the rotary machine and configured to generate signals corresponding to a rotating component of the rotary machine across multiple revolutions of the rotating component. The system also includes a processing unit configured to analyze the signals to generate multiple waveforms corresponding to the rotating component for the multiple revolutions and to estimate a clearance between the stationary and rotating components based upon the generated waveforms.

In accordance with yet another embodiment of the invention, a rotary machine is provided. The rotary machine includes a rotating component spaced apart from a stationary component. The rotary machine further includes a sensor disposed on the stationary component and configured to generate signals corresponding to the rotating component of the rotary machine across multiple revolutions of the rotating component. The rotary machine also includes a processing unit configured to analyze the signals to generate multiple waveforms corresponding to the rotating component for each of the revolutions and to estimate a clearance between the stationary and rotating components based upon the generated waveforms.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention include a clearance estimation system and method for a rotary machine. As used herein, non-limiting examples of the rotary machine includes an aircraft engine, a steam turbine and a gas turbine. The system and method provide a technique to improve a SNR to a desirable range by tracking engine revolutions per minute (rpm), correcting for changes in rpm and providing means for tracking a signal from a same rotating component for multiple revolutions.

Figure 1:
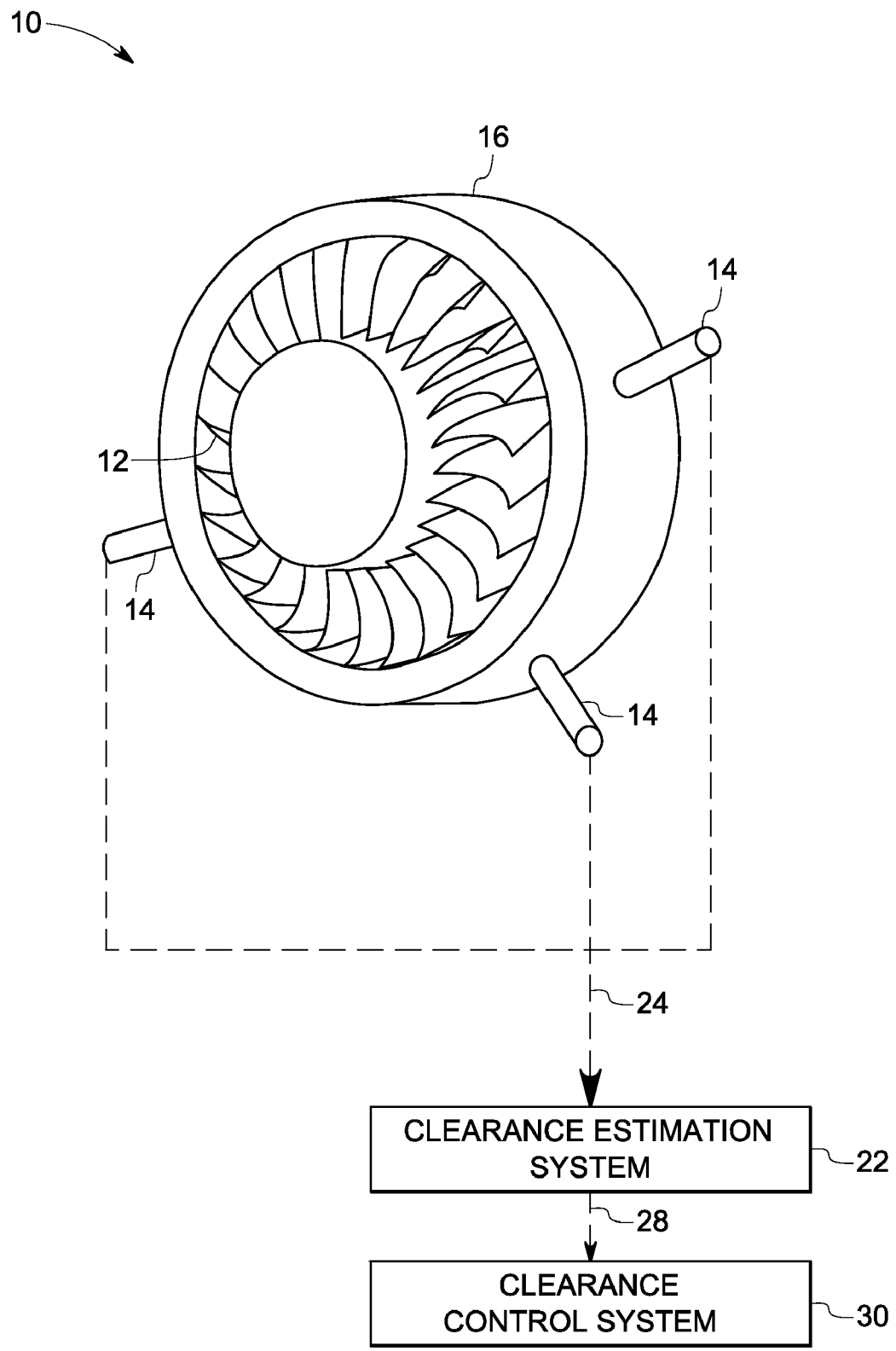
FIG. 1 is a diagrammatical perspective illustration of an engine having a clearance estimation system in accordance with embodiments of the present invention.

FIG. 1 is a diagrammatic illustration of an exemplary rotary machine such as a rotary turbine engine 10 including blades 12. At least one sensor 14 disposed on a shroud 16 around the engine 10 generates multiple signals corresponding to the blades 12 across a number of revolutions. In an example, the sensor 14 is a capacitive probe. The sensor 14 measures an operating parameter of the blades 12. In one embodiment, the sensor 14 measures a rotational speed of the blades 12. A clearance estimation system 22 coupled to the sensor 14 processes signals 24 from the sensor to generate multiple waveforms and estimates a clearance between the blades 12 and the shroud 16. A signal 28 corresponding to an estimation of the clearance is further fed into a clearance control system 30. The clearance control system 30 controls the clearance between the blades 12 and the shroud 16 based upon the signal 28.

Figure 2:
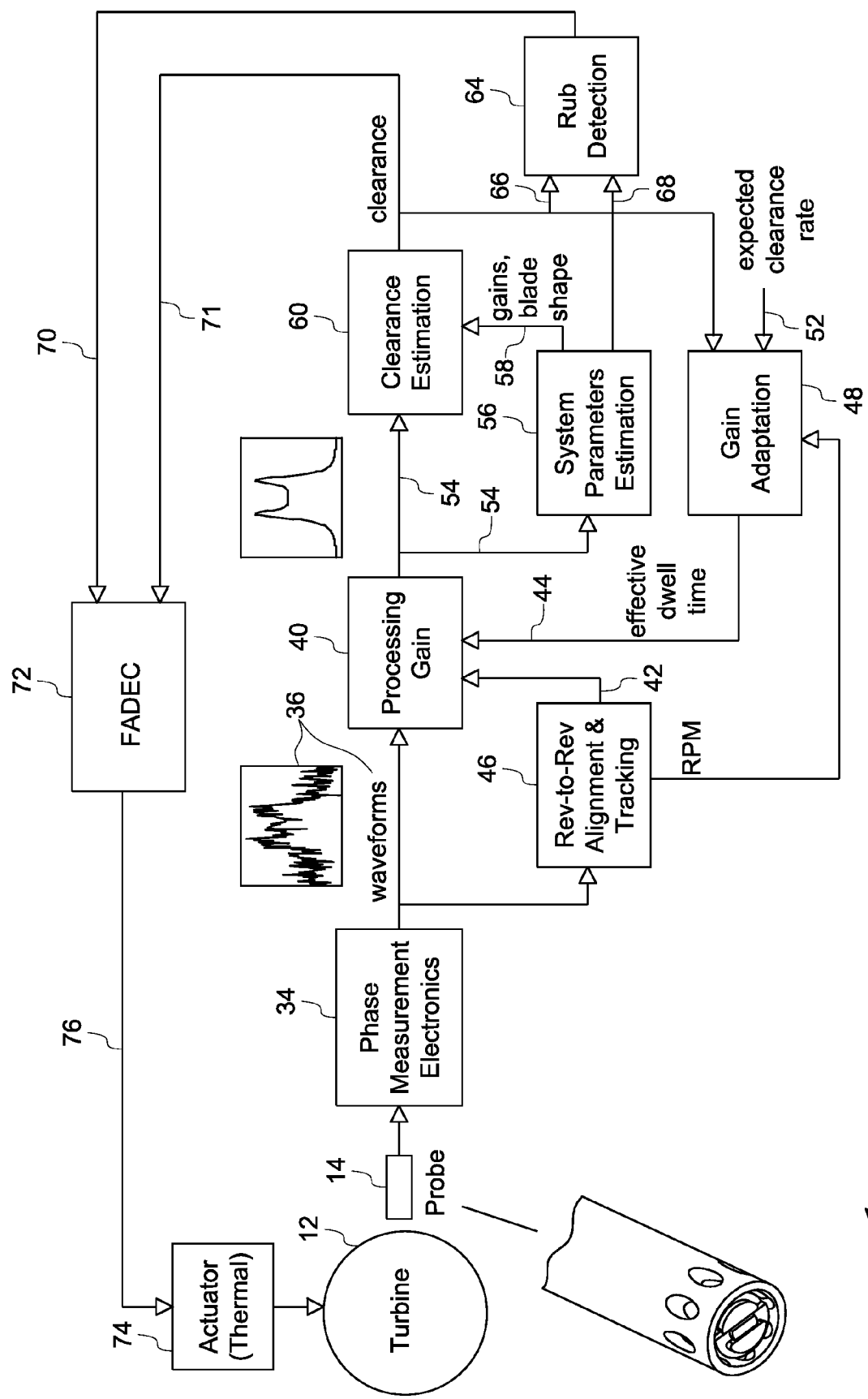
FIG. 2 is a diagrammatical illustration of the clearance estimation system of FIG. 1.

FIG. 2 is a block diagram representation of components within the clearance estimation system 22 in FIG. 1. The clearance estimation system 22 includes a phase measurement electronics unit 34 that receives the signals 24 (FIG. 1) from the sensor 14 (FIG. 1). The phase measurement electronics unit 34 generates multiple waveforms 36 corresponding to a number of respective revolutions of the blades 12. The waveforms 36 are input into a processing gain unit 40. The processing gain unit 40 reduces clearance estimation errors due to noise. In one embodiment, a low-pass filter is employed and an output is further averaged across revolutions. The processing gain unit 40 adds up the waveforms 36 for each of the blades 12 obtained over a number of revolutions based upon inputs 42, 44 received from a revolution-to-revolution alignment and tracking unit (Rev-to-rev alignment and tracking unit) 46 and a gain adaptation unit 48 respectively.

The Rev-to-rev alignment and tracking unit 46 employs an algorithm that enables tracking of rpm of the blades 12 over the number of revolutions and alignment of a centre of each of the blades 12 in the waveforms 36. The rev-to-rev alignment and tracking unit 46 is critical to obtaining an accurate processing gain from the processing gain unit 40 due to change in rpm of the blades 12. The change in rpm of the blades 12 over each revolution leads to a shift in location of the blades 12 in the waveforms 36. Accordingly, an alignment of a centre of each blade is desired. Furthermore, in order to align the waveforms, the variations in rpm need to be accurately tracked.

An output signal 42 of the rev-to-rev alignment and tracking unit 46 is further fed into the processing gain unit 40 and the gain adaptation unit 48. The gain adaptation unit 48 determines a time interval for averaging based upon an expected clearance change rate 52. The time interval may also be referred to as a dwell time. The dwell time is defined as a time during which the clearance is essentially constant. Consequently, a faster change in clearance corresponds to a shorter dwell time and vice versa. The output 44 is fed into the processing gain unit 40. An output signal 54 from the processing gain unit 40 is also transmitted to a systems parameters estimation unit 56. The systems parameters estimation unit 56 determines any change in parameters such as, for example, system gain or shape of blades 12 and further feeds corresponding signal 58 to a clearance estimation unit 60. The clearance estimation unit 60 also receives signal 54 from the processing gain unit 40. Furthermore, a rub detection unit 64 is employed to detect rubs between the blades and the shroud based on a change in squealer height of the blades reported by input signal 68 from the system parameters estimation unit 56, and input signal 66 from the clearance estimation unit 60. In the illustrated example, information signals 70 corresponding to a rub from the rub detection unit 64 and a clearance estimation signal 71 are transmitted to a full authority digital engine control (FADEC) 72 that is coupled to an actuator 74. In an example, the actuator is a thermal actuator. The actuator 74 accordingly controls movement of the turbine blade or shroud 12 based upon signals 76 received from the FADEC.

Figure 3:
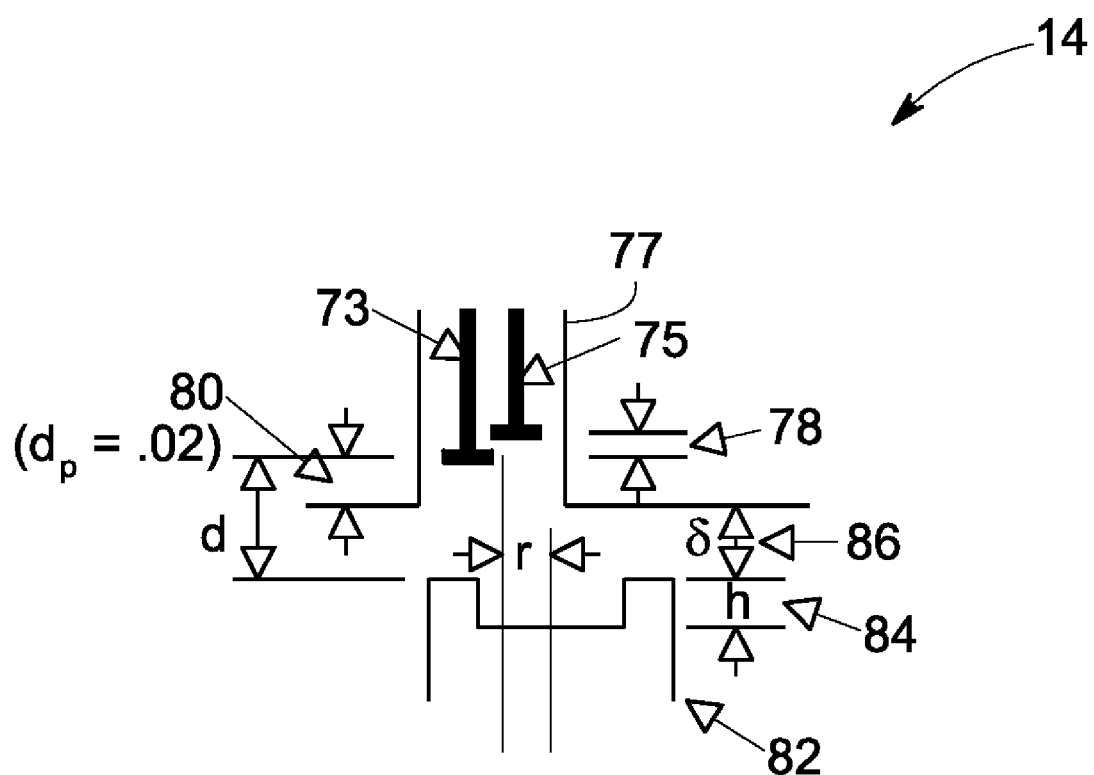
FIG. 3 is a diagrammatical illustration of an exemplary configuration of a sensor employed in the clearance estimation system of FIG. 2.

FIG. 3 is a diagrammatical illustration of an exemplary sensor 14, as referenced in FIG. 1, employed in the clearance estimation system 22 in FIG. 1. The sensor 14 includes a capacitive probe with a forward tip 73 and a setback tip 75 that are disposed within a shroud 77. The setback tip 75 is offset from the forward tip 73 by a setback distance represented by reference numeral 78. In an example, the setback distance is about 0.375 mm. The forward tip 73 is recessed by a pullback distance 80 from the shroud 77. In one embodiment, the pullback distance is about 0.75 mm. The shroud 77 is separated from a blade 82 having a squealer height represented by reference numeral 84. In an example, the squealer height is about 1.25 mm. A clearance 86 is further provided between the blade 82 and the shroud 77.

Figure 4:
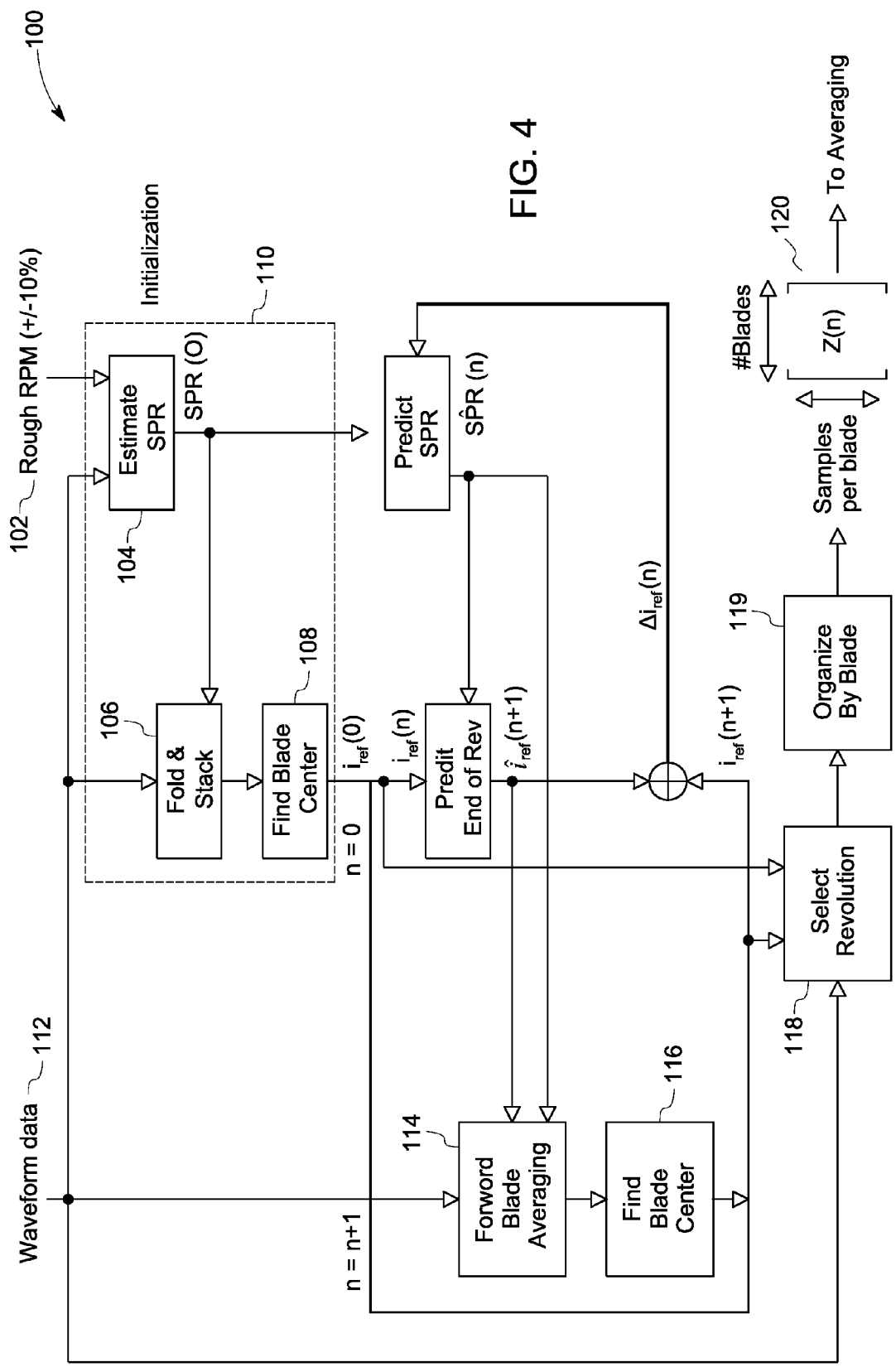
FIG. 4 is a diagrammatical illustration of an exemplary blade tracking and alignment algorithm employed in the clearance estimation system of FIG. 2.

FIG. 4 is a block diagram representation of a tracking and alignment algorithm 100 employed in the rev-to-rev tracking and alignment unit 46 in FIG. 2. A rough estimate of rpm 102 is used to initially obtain an estimate of sample per revolution (SPR) 104. In one embodiment, the estimate is obtained by performing a Fourier transform. The variation in rpm with each revolution leads to a difference in samples obtained per revolution. The estimate of SPR 104 is used to align and sum up waveforms of respective blades represented by a fold and stack unit 106. In one embodiment, the waveforms corresponding to all blades within one revolution are aligned and summed in the initialization step 110. The alignment and summation enables sufficient SNR gain to allow initial determination of the center of a blade at step 108, resulting in an initial reference point $i_{ref}(0)$ corresponding to an initial location of center of first blade. Successive occurrences of the center of the first blade $i_{ref}(n)$ are estimated based upon continuously updating an estimated SPR for each revolution, denoted by $\widehat{SPR}(n)$ for the nth revolution, and applying that estimate to predict the end of each revolution, hence location of the next occurrence of the center of the first blade. An error between the predicted and actual locations of the blade center is computed by forward aligning and averaging a number of adjacent blades, based on the predicted SPR, and comparing the resulting waveform's center to the predicted center, as illustrated by reference numerals 112, 114 and 116. This error or difference, denoted by $\Delta i_{ref}(n)$, between predicted $i_{ref}(n)$ and measured $i_{ref}(n)$ is fed back to the Predict SPR block to track changes in rpm in closed loop. Once the successive centers of the first blade are known, the centers of the remaining blades can be inferred. These blade centers are then used in 118 to extract from the input waveform data 112 a waveform for each blade for each revolution. These waveforms are organized by 119 into a matrix 120, represented by Z(n), wherein each column represents a different blade and each row is a different sample within the waveform for that blade. The matrix 120 is further used to perform averaging via a signal processing algorithm described below in FIG. 5.

Figure 5:
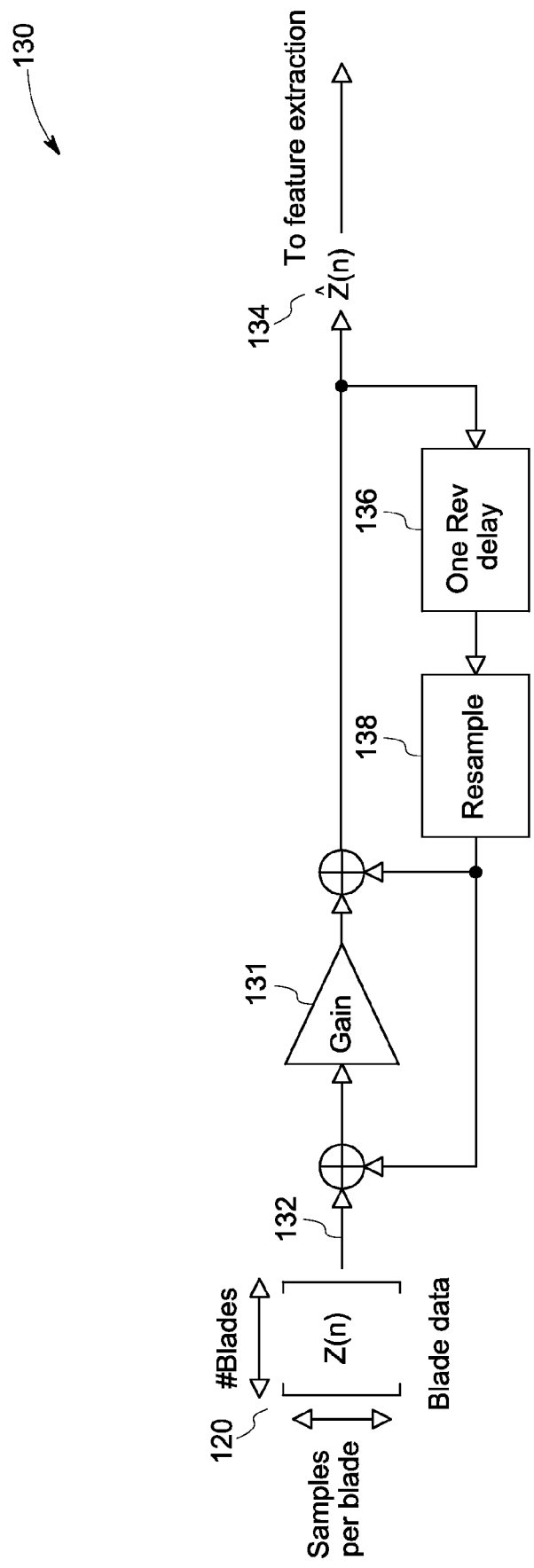
FIG. 5 is a diagrammatical illustration of an exemplary signal processing algorithm employed in the clearance estimation system of FIG. 2.

FIG. 5 is a block diagram representation of an exemplary signal processing algorithm 130 employed in the processing gain unit 40 in FIG. 2. The signal processing algorithm includes a rev-to-rev averaging algorithm that averages multiple matrices Z(n), wherein n=0, 1, 2 . . . obtained in FIG. 4. Signals 132 representing the matrix 120 is fed into the gain unit 131 that multiplies the matrix 120 by a gain factor. The result is added to a resampled version of the output 134 of the algorithm 130 from the previous revolution, generating a matrix 134, represented by $\hat{Z}(n)$. The gain factor represents a weighting applied to each revolution, and determines the effective dwell time. In one embodiment, the gain factor is about 1. In another embodiment, the gain factor is about 0.02. In yet another embodiment, the gain factor varies as the clearance changes.

It should be noted that the number of samples per blade forming the rows of the matrix 120 varies with a change in rpm. Accordingly, the number of rows of the matrix 120 can vary with each revolution. Hence, a dynamic adjustment of the number of rows is needed to add up the matrices corresponding to successive revolutions. For example, a difference in number of samples per blade for a nth revolution and a (n−1)th revolution may be 1. In such a case, the number of rows of $\hat{Z}(n-1)$, have to be dynamically adjusted to match the number of rows of Z(n). In accordance, after a time delay corresponding to a one-revolution delay introduced by 136, the matrix 134 is resampled to dynamically adjust its number of rows to match the number of rows of a successive matrix 120 before it is added to that matrix. A recursive loop of resampling 138 is performed to complete the averaging.

Figure 6:
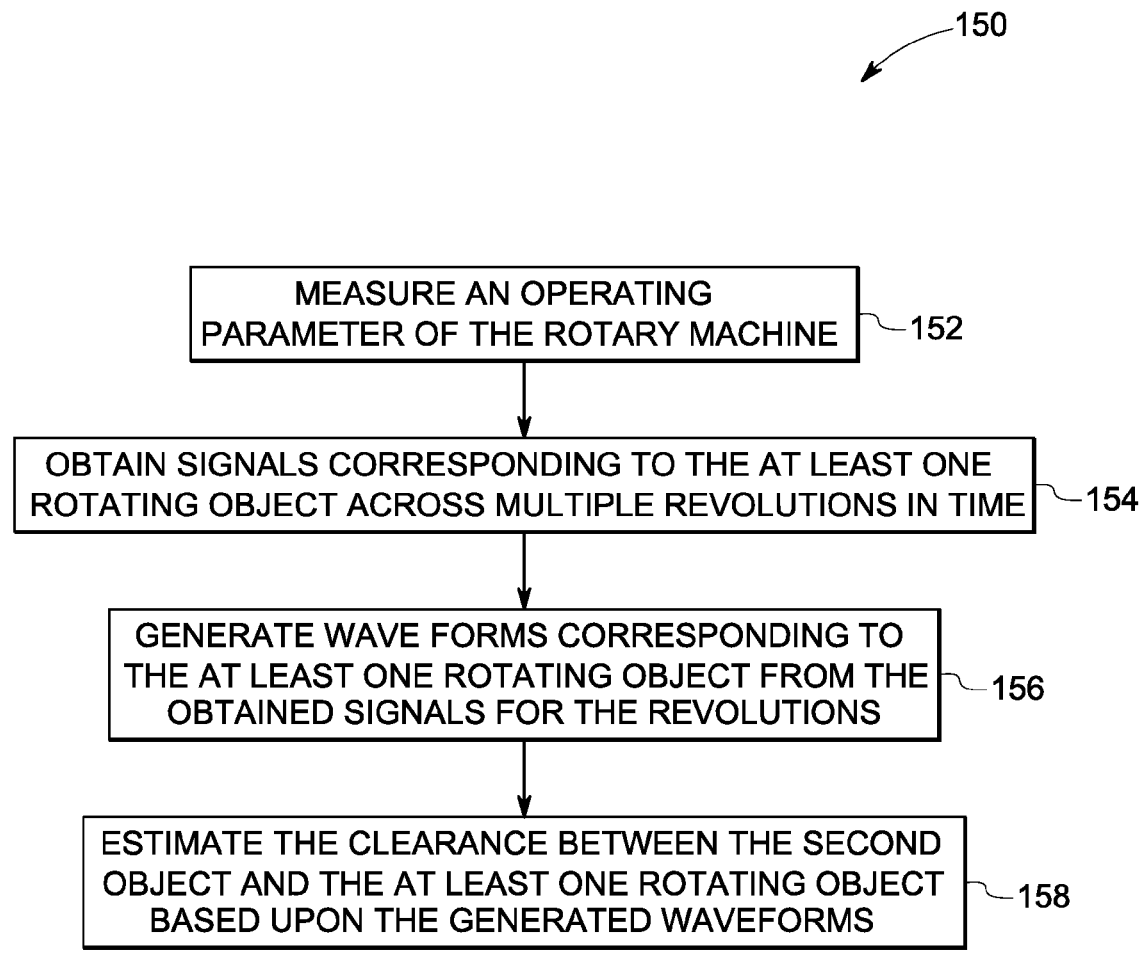
FIG. 6 is a flow chart representing steps in a method for estimating clearance between at least one rotating object of a rotary machine and a second object.

FIG. 6 is a flow chart representing steps in a method 150 for estimating a clearance between at least one rotating object of a rotary machine and a second object is provided. The method 150 includes measuring an operating parameter of the rotary machine in step 152. A non-limiting example of an operating parameter includes a rotational speed of the engine. Signals corresponding to at least one rotating object across multiple revolutions in time, wherein the multiple revolutions are determined based upon the measured operating parameter are obtained in step 154. Waveforms corresponding to the at least one rotating object from the obtained signals are generated in step 156. The clearance between the second object and the at least one rotating object is estimated based upon the generated waveforms in step 158. In one embodiment, the clearance is estimated by combining the waveforms generated. In a non-limiting example, the waveforms are averaged for each of the revolutions. In a particular embodiment, a signal representative of the estimated clearance is supplied to a clearance control system. In an example, the clearance control system is a FADEC coupled to an actuator in a turbine engine installed on an aircraft. In other non-limiting examples, the clearance control system is an engine or blade health monitoring system. In yet another embodiment, one or more health indicators are displayed for the at least one rotating object that include information about the estimated clearance. In another embodiment, one or more operating parameters are controlled based at least in part on the estimated clearance. In yet another embodiment, the processing gain is estimated by combining the generated waveforms for multiple blades of the at least one rotating object. In another exemplary embodiment, the number of revolutions is adjusted based upon the measured operating parameter, or an estimated clearance, or a desired clearance, or combinations thereof. In another embodiment, an occurrence of rub is detected for the at least one blade based upon the generated waveforms.

Figure 7:
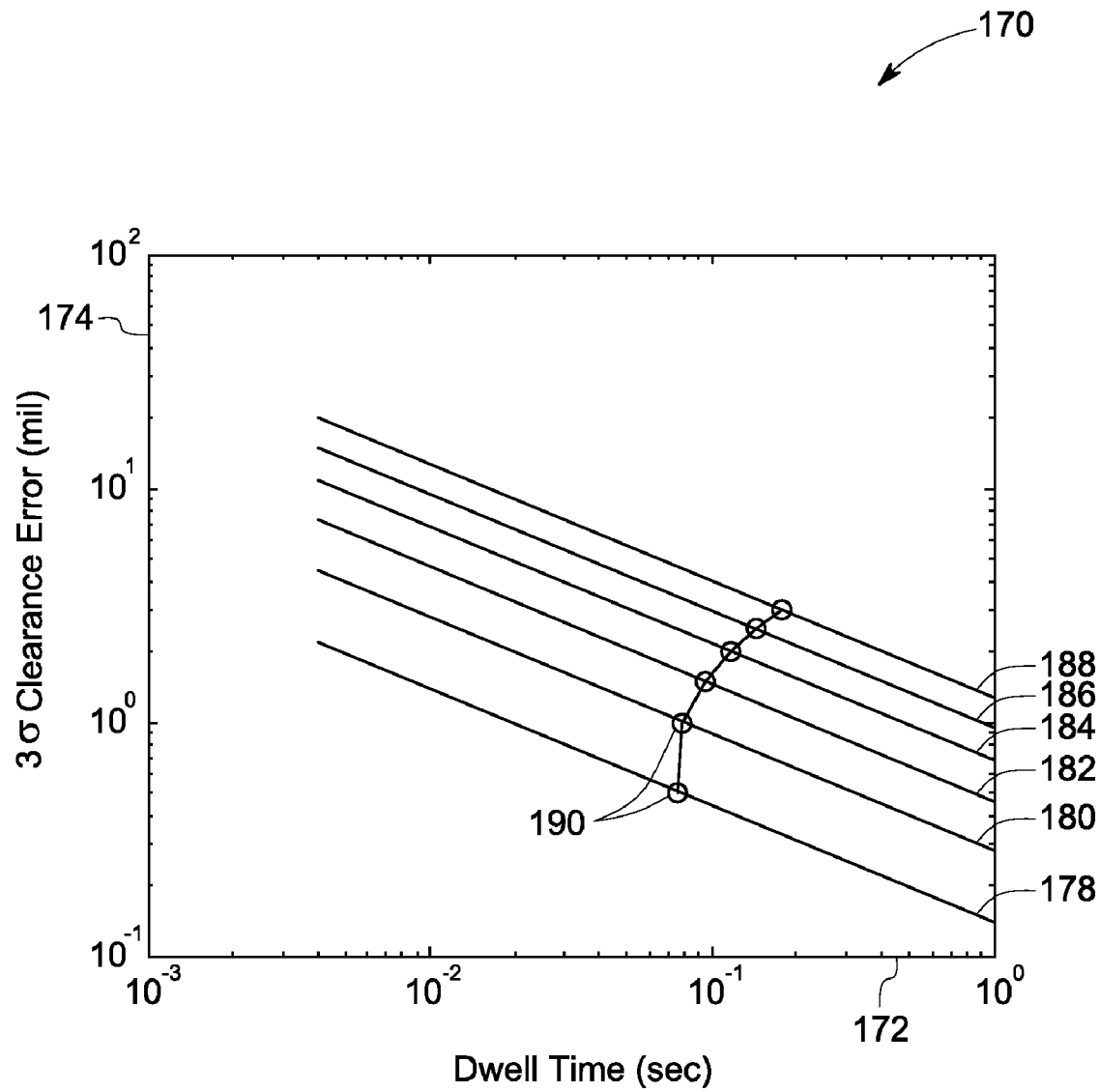
FIG. 7 is a graphical representation of an exemplary dwell time vs. clearance error relationship for a sensor employed in the clearance estimation system of FIG. 2.

FIG. 7 is a graphical illustration of a log-log plot 170 of clearance error as a function of dwell time in an exemplary clearance estimation system. The X-axis 172 represents the dwell time in seconds, while the Y-axis 174 represents a 3σ clearance error in mils. Curves 178, 180, 182, 184, 186, and 188 represent clearances of 10 mil, 20 mil, 30 mil, 40 mil, 50 mil, and 60 mil respectively. The slope of these curves is 0.5 since clearance error standard deviation varies inversely as the square root of dwell time. The circles 190 on each of the curves represent an ideal error point of operation (in this case, desired maximum error of 5%). The Y-axis projection of these circles give the minimum dwell time required for each clearance to stay below the desired maximum error.

Figure 8:
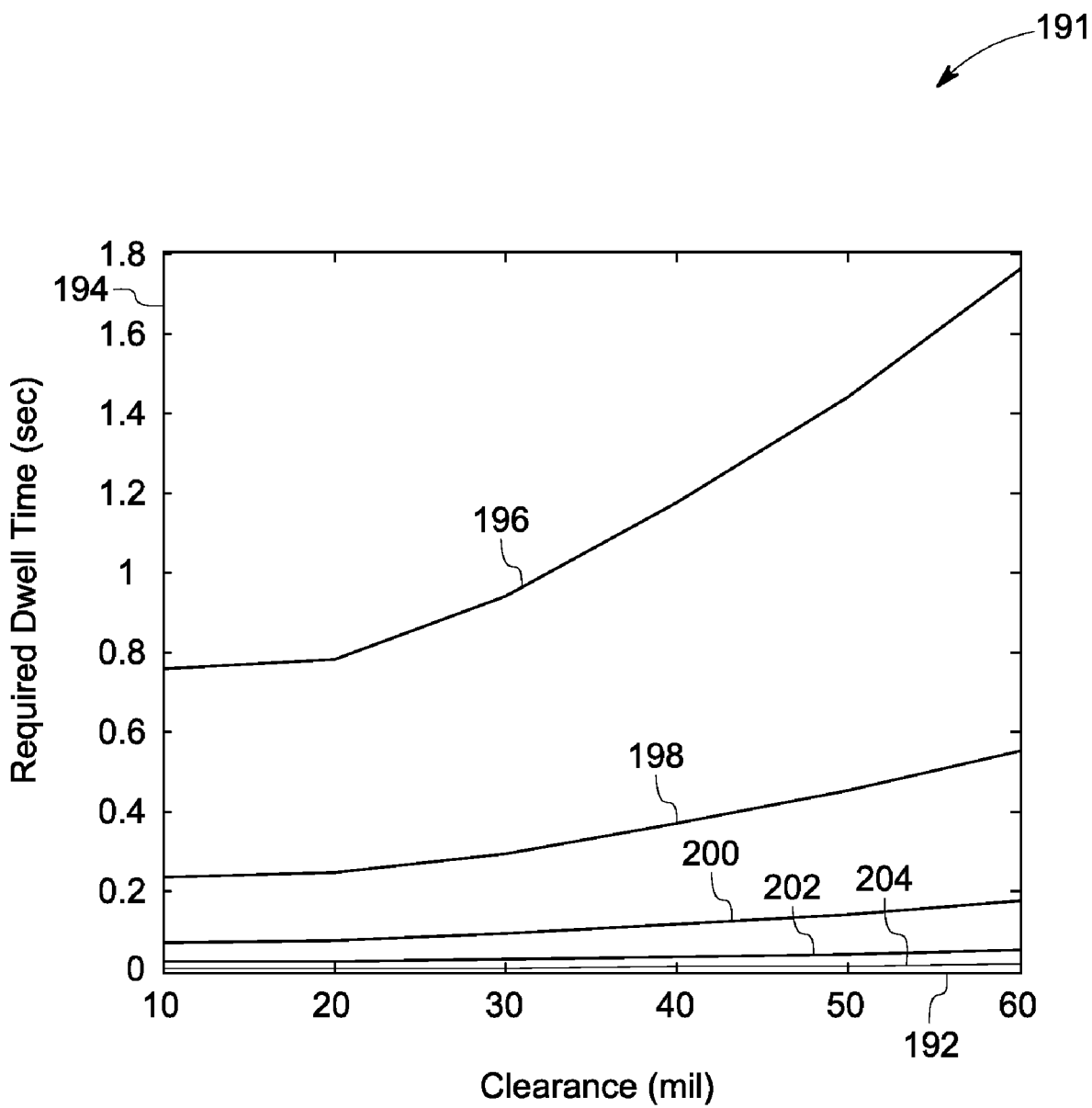
FIG. 8 is a graphical representation of an exemplary required dwell time vs. clearance relationship for a sensor employed in the clearance estimation system of FIG. 2.

FIG. 8 is a graphical illustration 191 of required dwell time as a function of clearance in the exemplary clearance estimation system in FIG. 7. The X-axis 192 represents clearance in mil. The Y-axis 194 represents required dwell time in sec. Curves 196, 198, 200, 202, and 204 represent the variation of dwell time with clearance for probes with different raw SNR capabilities, viz., SNR at 10 mils clearance of 20 dB, 25 dB, 30 dB, 35 dB and 40 dB respectively. The plot 191 illustrates that a dwell time of less than about 0.5 sec is achievable within operational clearance range of about less than about 50 mils, with a probe that achieves raw SNR at 10 mils of greater than about 25 dB.

The various embodiments of systems and methods for clearance estimation described above thus provide a way to improve SNR of a sensor system without additional cost and complexity in the system. These techniques and systems also allow for accurate tracking of revolutions per minute of components of a rotating object in order to coherently add up signals from multiple revolutions. In addition, the present techniques provide accurate clearance estimates independent of drifts due to component aging, temperature, and other harsh environmental effects.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of an example of a rev-to-rev tracking and alignment unit described with respect to one embodiment can be adapted for use with a blade health monitoring system described with respect to another. Similarly, the various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A method of estimating a clearance between at least one rotating object of a rotary machine and a second object, comprising:
   measuring an operating parameter of the rotary machine;
   obtaining signals corresponding to the at least one rotating object across a plurality of revolutions in time, wherein a number of the plurality of revolutions is adjusted based upon the measured operating parameter, or an estimated clearance, or a desired clearance, or the desired clearance estimation error, or combinations thereof;

generating wave forms corresponding to the at least one rotating object from the obtained signals for the revolutions; and estimating the clearance between the second object and the at least one rotating object based upon the generated waveforms comprising estimating a processing gain by combining the generated waveforms for each of the revolutions.

2. The method of claim 1, further comprising supplying a signal representative of the estimated clearance to a clearance control system for the rotary machine.

3. The method of claim 1, further comprising displaying one or more health indicators for the at least one rotating object that include information about the estimated clearance.

4. The method of claim 1, further comprising controlling one or more operating parameters for the rotary machine based at least in part on the estimated clearance.

5. The method of claim 1, wherein the operating parameter comprises a rotational speed of the rotary machine.

6. The method of claim 1, wherein the at least one rotating object comprises a rotor having at least one blade, the method further comprising aligning the waveforms corresponding to the at least one blade in response to a change in the operating parameter.

7. The method of claim 1, wherein combining the generated waveforms comprises averaging the generated waveforms for each of the revolutions.

8. The method of claim 1, wherein the at least one rotating object comprises a rotor having a plurality of blades, the method further comprising estimating the processing gain by combining the generated waveforms for the blades.

9. The method of claim 1, further comprising detecting an occurrence of rub for the at least one rotating object based upon the generated waveforms.

10. A clearance estimation system for a rotary machine, comprising:

a sensor disposed on a stationary component of the rotary machine and configured to generate a plurality of signals corresponding to a rotating component of the rotary machine across a plurality of revolutions of the rotating component, wherein a number of the plurality of revolutions is determined based upon a measured operating parameter;

a processing unit configured to adjust the number of revolutions based upon the measured operating parameter, or an estimated clearance, or a desired clearance, or the desired clearance estimation error, or combinations thereof;

the processing unit configured to analyze the signals to generate a plurality of waveforms corresponding to the rotating component for the plurality of revolutions; and the processing unit configured to estimate a processing gain by combining the generated waveforms for each of the revolutions and to estimate a clearance based upon the estimated processing gain to estimate a clearance between the stationary and rotating components.

11. The clearance estimation system of claim 10, wherein the sensor is configured to generate a plurality of signals corresponding to a plurality of blades of a rotor of the rotary machine.

12. The clearance estimation system of claim 10, wherein the sensor is configured to measure an operating parameter of the rotary machine and wherein the processing unit is configured to estimate a number of the revolutions based upon the measured operating parameter.

13. The clearance estimation system of claim 10, wherein the operating parameter comprises a rotational speed of the rotary machine.

14. The clearance estimation system of claim 10, wherein the processing unit is further configured to align the generated wave forms corresponding to the rotating component in response to a change in the operating parameter.

15. The clearance estimation system of claim 14, wherein the processing unit is configured to detect an occurrence of a rub for the rotating component based upon the estimated processing gain.

* * * * *

UNITED STATES PATENT AND TRADEMARK OFFICE
CERTIFICATE OF CORRECTION

PATENT NO. : 7,853,427 B2  Page 1 of 1
APPLICATION NO. : 12/118904
DATED : December 14, 2010
INVENTOR(S) : Chan et al.

It is certified that error appears in the above-identified patent and that said Letters Patent is hereby corrected as shown below:

In Fig. 4, Sheet 4 of 8, for Tag "114", Line 1, delete "Forword", and insert -- Forward --, therefor.

In Fig. 4, Sheet 4 of 8, delete " 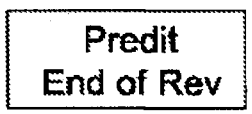 " and insert -- 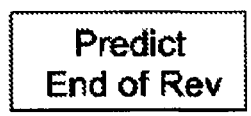 --, therefor.

In Fig. 4, Sheet 4 of 8, delete " 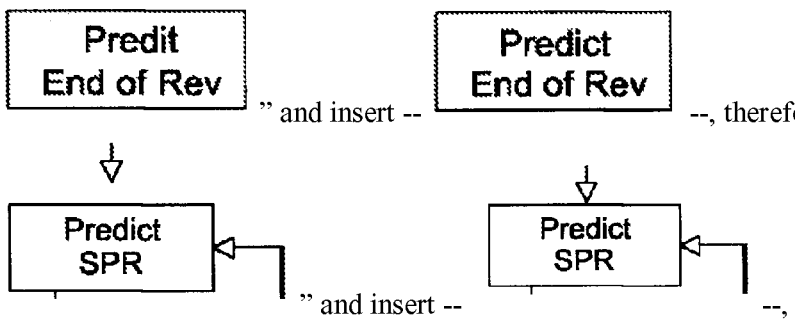 " and insert --  --, therefor.

In Fig. 6, Sheet 6 of 8, for Tag "156", Line 1, delete "WAVE FORMS", and insert -- WAVEFORMS --, therefor.

In Column 7, Line 1, in Claim 1, delete "wave forms" and insert -- waveforms --, therefor.

In Column 8, Line 32, in Claim 14, delete "wave forms" and insert -- waveforms --, therefor.

Signed and Sealed this
Twenty-sixth Day of June, 2012

David J. Kappos
*Director of the United States Patent and Trademark Office*